US006795739B2

(12) United States Patent
Graf et al.

(10) Patent No.: US 6,795,739 B2
(45) Date of Patent: Sep. 21, 2004

(54) METHOD FOR ORGANIZING THE EXECUTION OF ELECTRONICALLY CONTROLLED SWITCHING PROCESSES

(75) Inventors: Ruediger Graf, Neuhof (DE); Georg Rupprecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 99 days.

(21) Appl. No.: 10/314,340

(22) Filed: Dec. 9, 2002

(65) Prior Publication Data

US 2003/0128087 A1 Jul. 10, 2003

Related U.S. Application Data

(63) Continuation of application No. PCT/DE01/02101, filed on Jun. 6, 2001.

(30) Foreign Application Priority Data

Jun. 7, 2000 (DE) .......................................... 100 28 140

(51) Int. Cl.[7] .......................... G05B 19/42; G05B 11/01
(52) U.S. Cl. ...................... 700/86; 700/23; 318/568.11; 717/104; 717/110; 717/124; 718/107; 714/38
(58) Field of Search .............................. 700/86, 23, 18, 700/169; 318/568.11, 571; 710/5, 262, 104, 110, 124, 140; 718/107, 100; 714/38

(56) References Cited

U.S. PATENT DOCUMENTS

| | | | | |
|---|---|---|---|---|
| 3,719,931 A | * | 3/1973 | Schroeder ..................... | 700/11 |
| 4,107,645 A | * | 8/1978 | Lewis et al. .................. | 180/270 |
| 4,648,027 A | * | 3/1987 | Toyooka et al. ............... | 700/79 |
| 4,703,414 A | * | 10/1987 | Inoue et al. ................... | 700/18 |
| 5,128,857 A | * | 7/1992 | Okada et al. .................. | 700/21 |
| 5,177,420 A | * | 1/1993 | Wada et al. ........... | 318/568.311 |
| 5,230,061 A | * | 7/1993 | Welch ......................... | 706/46 |
| 5,283,896 A | * | 2/1994 | Temmyo et al. ............ | 718/104 |
| 5,781,775 A | * | 7/1998 | Ueno .......................... | 718/102 |
| 6,047,278 A | * | 4/2000 | Winkelmann ................. | 706/51 |
| 6,184,595 B1 | * | 2/2001 | Flegel, Jr. .................... | 307/114 |
| 6,256,598 B1 | * | 7/2001 | Park et al. ...................... | 703/2 |
| 6,272,578 B1 | * | 8/2001 | Jinkawa ....................... | 710/110 |

FOREIGN PATENT DOCUMENTS

| | | |
|---|---|---|
| DE | 41 34 811 A1 | 4/1993 |
| DE | 195 20 538 C2 | 12/1996 |
| DE | 199 51 152 A1 | 5/2000 |
| DE | 100 26 387 A1 | 12/2001 |

OTHER PUBLICATIONS

T. Kozlowski et al., "Parallel controller synthesis using Petri nets", IEEE Proceedings—Computers and Digital Techniques, vol. 142, Issue 4, Jul. 1995, pp. 263–271.*

Venkatesh Kurapati, et al, "Design of Sequence Controllers Using Petri Net Models", Systems, Man and Cybernetics, IEEE, Oct. 22, 1995, pp. 3469–3474, ISBN 0–7803–2559–1, New York, NY.

F Cottet, "Integrez Une Application D'Automatismes Sur Un PC", Measures Regulation Automatisme, CFE., vol. 60, No. 682, Feb. 1, 1996, pp. 69–70, 73–74, Paris FR.

(List continued on next page.)

Primary Examiner—Anthony Knight
Assistant Examiner—Crystal J. Barnes
(74) Attorney, Agent, or Firm—Sughrue Mion, PLLC

(57) ABSTRACT

A method for organizing the execution of electronically controlled switching processes, in which sequential and/or parallel steps (S1 to S9) are activated by preset transition conditions (T1 to T9) and are deactivated by the advancement of the execution. During the activation of a step (S1 to S9), respectively inadmissible parallel steps are deactivated, each of the respectively inadmissible steps previously having been documented in a stored matrix.

11 Claims, 2 Drawing Sheets

OTHER PUBLICATIONS

T.O. Boucher, et al, "Developing a Class of Sequential Function Charts From Petri Nets", Computer Integrated Manufacturing and Automation Technology, IEEE, Oct. 10, 1994, pp. 163–168, ISBN 0–8186–6510–6 Troy, NY.

Herve Paneto, et al "Contribution of the Grafcet Model to Synchrony in Discrete Events Systems Modelling", Industrial Electronics, Control and Instrumentation, IEEE, Sep. 5, 1994, ISBN 0–7803–1328–3, pp. 1527–1532, New York, NY.

Carla Ferreira, et al, "Automatic Generation of C–Code or PLD Circuits Under SFC Graphical Environment", Industrial Electronics, IEEE, Jul. 7, 1997, ISBN 0–7803–3936–3, pp. SS181–SS185, New York, NY.

Anders Hellgren, et al, "Synchronised Execution of Discrete Event Models Using Sequential Function Charts", Decision and Control, IEEE, Dec. 7, 1999, ISBN 0–7803–5250–5, pp. 2237–2242, Phoenix, AZ.

* cited by examiner

METHOD FOR ORGANIZING THE EXECUTION OF ELECTRONICALLY CONTROLLED SWITCHING PROCESSES

This is a Continuation of International Application PCT/DE01/02101, with an international filing date of Jun. 6, 2001, which was published under PCT Article 21(2) in German, and the disclosure of which is incorporated into this application by reference.

FIELD OF AND BACKGROUND OF THE INVENTION

The present invention relates to a method for organizing the execution of electronically controlled switching processes. More particularly, the invention relates to such a method for organizing the execution of electronically controlled switching processes in which sequential and/or parallel steps are activated by preset transition conditions and are deactivated by advancement of the execution beyond that step. In addition, the present invention relates to a software tool that is suitable for carrying out the method, and, furthermore, to a programming device having a software tool of this type.

The organization of sequence control systems is typically preset via corresponding programming in a programming device. The switching procedures in these sequence control systems, referred to here in simplified form as executions, are carried out using various actuators, for instance also including evaluation of sensor data. A process to be controlled is displayed graphically and additionally embodied in programming form in the programming device or personal computer through corresponding function and data models. The processing aspects are of central importance, in particular, in the function model and thus form network nodes.

The data streams are controlled by control data or events. While the network nodes may be refined and used for displaying even complex processes, however, an array of boundary conditions must be maintained in order to ensure conformity to the actual processes. The sequence control systems may also be represented, in a manner known per se as Petri networks. Petri networks evince strict formalization, may be represented graphically and also analytically, and can easily be made accessible to processing by the programming device. These representations based on Petri networks are, for example, described in Industry Standard DIN EN 61131 and are essentially formed by groups of steps and transitions (advancement conditions), which can be linked and/or marked with directed connections. Herein, each step is composed of individual actions and each transition has a transition condition.

Both parallel and sequential executions of the control system can be described using the known Petri networks, this methodology also permitting individual locations of the network, and therefore also steps of the sequence control system, to be marked multiple times. However, this does not typically make sense from the viewpoint of sequence control, this being true not only for the same step, but even for steps lying one after another in linear sections. This means that, even though branching to parallel executions is admissible, this parallelism is absolutely required to be brought back orderly together, since a change to a parallel execution is inadmissible per se.

OBJECTS OF THE INVENTION

The present invention therefore has an object of providing a method for organizing the execution of electronically controlled switching processes, in which it is ensured that only admissible network states are achieved in a sequence control system. In addition, a software tool for carrying out the method is to be provided.

SUMMARY OF THE INVENTION

According to one formulation of the invention, these and other objects are solved by a method for organizing the execution of electronically controlled switching procedures, in which sequential and/or parallel steps are activated by preset transition conditions and are deactivated by the advancement of the execution, and in which, advantageously, inadmissible parallel steps are deactivated during the activation of a step, wherein the respective inadmissible steps were previously recorded in a stored matrix. Software tools and programming devices utilizing the inventive method are also encompassed by the present invention.

The activation of steps that potentially lead to inadmissible combinations arises due to, for example, an inadmissible graphic transition in the execution plan, an external activation, or an activation through step activity. To resolve the situation, an intervention by hand, for example, is first and foremost considered, i.e., the operator on the machine to be controlled gives the explicit signal to activate a specific step. However, depending on the capabilities of the programming system on which the electronic data processing is based, this may also be performed by a pinpointed activation as an activity of another step.

It may be possible to recognize potential conflict situations during the activation of the steps in the graphic of the execution plan at the time this plan is drawn up. However, this is neither sufficiently reliable nor absolutely necessary for most applications. For one thing, a graphic transition of this type does not automatically have to occur dynamically at a time at which this parallel branch is occupied, so to speak. Furthermore, the error situation may arise even in graphics that are free of conflict by way of the external intervention possibilities described above.

The methods and systems according to the present invention are advantageous above all because parallelism in the execution plan does not have to be dispensed with entirely, as was sometimes necessary up to now. It is also no longer necessary to protect the machines to be controlled in such a way that they react good-naturedly to the conflicts arising.

These and further features according to the preferred refinements of the present invention are disclosed not only by way of the claims but also from the description and the drawings. The individual features and aspects of the invention are capable of being implemented alone or jointly, e.g. in the form of sub-combinations of the preferred embodiments of the present invention. These features and aspects of the invention are also capable of being utilized in other fields and provide advantageous embodiments which are within the scope of the present invention in their own right and for which protection is sought.

BRIEF DESCRIPTION OF THE DRAWINGS

The present invention will be described with reference to the exemplary embodiment illustrated in the drawing.

DETAILED DESCRIPTION OF THE PREFERRED EMBODIMENTS

Figure 1:
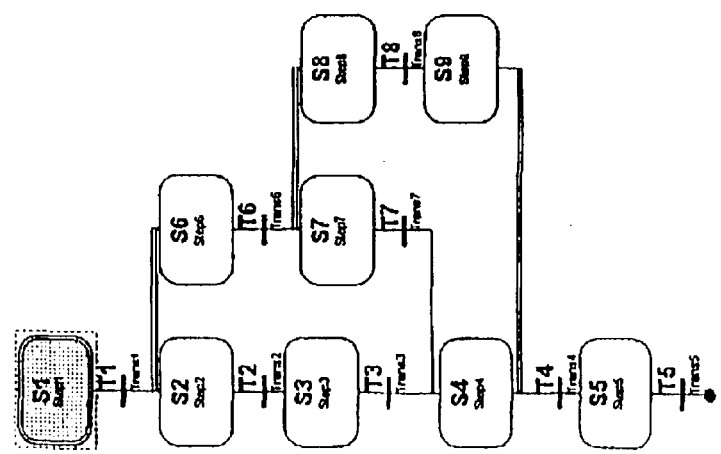
FIG. 1 shows an example of an execution plan for a control task as a Petri network with the activation of a first step.

FIG. 1 shows a graphic illustration of a Petri network to describe a sequence control for an industrial process or a machine control. A software tool, which is executable on a programming device, is provided for displaying and for the further processing of the Petri network. The actual control process, having steps for activating valves, pumps, motors, or the like, does not need to be described in more detail here to understand the present invention.

Steps S1 to S9, which are linked to one another using directed connections via transition or advancement conditions T1 to T9, are described using the elements of the Petri network. Each step S1 to S9 may comprise individual actions and each transition has a transition condition. A step S1 to S9 is either active or deactivated and typically correspondingly outputs binary or digital data as output variables. In addition, the activation of individual steps S1 to S9 may be subject to time monitoring. In this case, a transition T1 to T9 must follow each of the steps S1 to S9, wherein a transition always represents a condition for the transition to the next step provided in the program execution. The fulfillment of a transition T1 to T9 leads to activation of all steps directly following in the execution plan and to deactivation of all steps directly preceding the transition.

In the illustration in FIG. 1, parallel branchings are indicated at steps S5 and S7 as well as S8 and S9. This is an AND-branching of the steps, in which steps S2 and S6 are activatable after fulfilling transition T1 and steps S7 and S8 are activatable after fulfilling transition T6.

As shown in FIG. 1, firstly, step S1 is activated as an initial step, the activation being depicted by a gray background of the box symbol for step S1.

In the further execution of the control program, it is not out of the question that, as described in the introduction to the description, a signal prompting performance of a specific inadmissible step is triggered, for example, due to an intervention of the operator on the machine to be controlled. Such a situation may arise also when a targeted activation is produced as an activity of another step in the electronic data processing. For example, it would then be possible that, through one of the processes described above, steps S2, S4, and S9 are activated simultaneously in the illustration in FIG. 1 in an inadmissible way. This is to be prevented.

Figure 2:
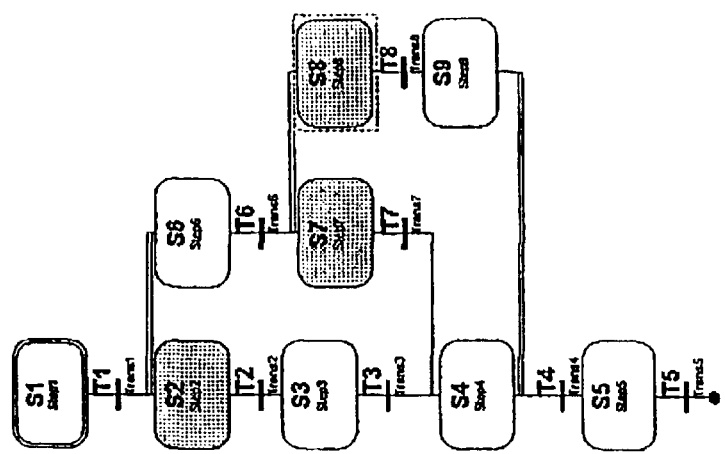
FIG. 2 shows the execution plan of FIG. 1 modified by a subsequent activation of a further step.

Starting from active step S1 shown in FIG. 1, the dynamically occurring valid situation, shown in FIG. 2 by way of example, in which steps S2, S7, and S8 are rendered active, may also arise through regular switching processes. If transition T7 now switches, step S4 is, of course, activated and step S7 is deactivated. However, this would also lead to the typically undesired situation in which steps S2 and S8 are still active, but step S4 is also active.

It is now possible to dynamically recognize such conflict situations and automatically correct them through preset rules, through which it is always ensured that only admissible network states are achieved. The basic idea here is that each step S1 to S9 has, through the input of the controlling process, the knowledge of which steps are able to be active in parallel to itself.

The solution according to the invention is divided into two parts for its implementation. First, at the time of project planning, a matrix is drawn up, on the basis of the graphic network construction of the sequence control, in which, for each step S1 to S9, the other steps which may not be activated simultaneously are marked. Furthermore, at the time of execution, this matrix is checked upon each activation of a step S1 to S9, and every step S1 to S9 that is in conflict with that step is automatically deactivated. The typical rules apply for the deactivation, so that this is performed in the same manner as a normal switching process.

Figure 3:
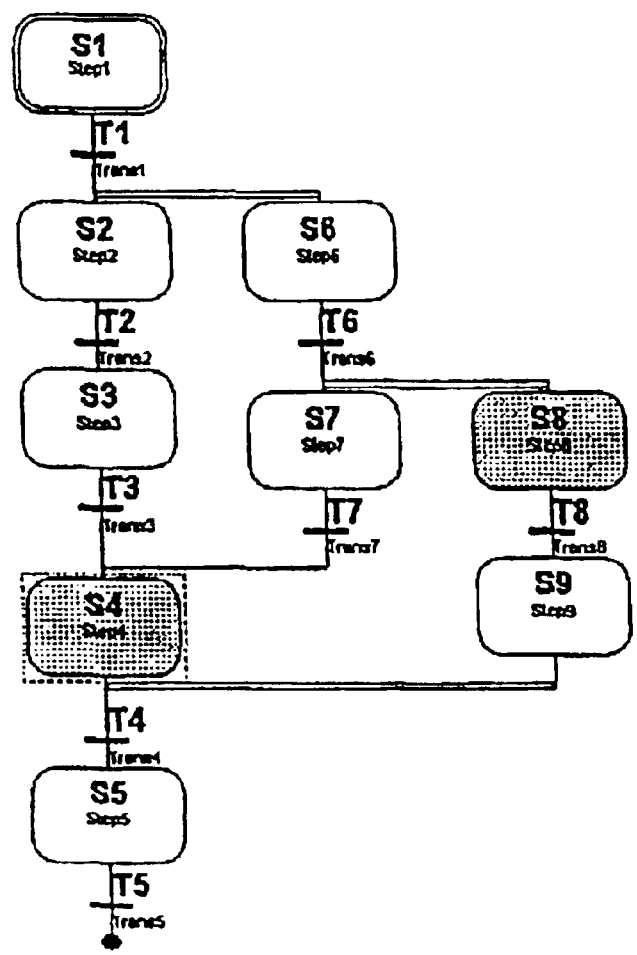
FIG. 3 shows the execution plan of FIG. 1 modified by a further subsequent activation of a step, together with a deactivation of inadmissible parallel steps.

On the basis of the exemplary embodiment shown in FIG. 2, the system now automatically determines that step S2 may not be active simultaneously with step S4 and causes an automatic deactivation of step S2. In this way, the correct state shown in FIG. 3, having active steps S4 and S8, results. Therefore, for each activation of one of the steps S1 to S9, every inadmissible parallel step is automatically deactivated. The inventive method is able to be applied independently of the type of activation, such as graphic transition, activation from outside, or activation through step activity.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for organizing execution of electronically controlled switching processes, in which at least one of sequential and parallel steps are activated for execution by preset transition conditions and are deactivated by advancement of the execution, and in which respective inadmissible parallel steps are deactivated during activation of the activated steps, wherein the respective inadmissible steps are saved beforehand in a stored matrix.

2. The method according to claim 1, wherein just activated steps and already active steps are compared to the saved steps in the stored matrix upon the activation of the activated step.

3. The method according to claim 1, wherein the activated steps are activated from outside or through step activity.

4. The method according to claim 1, wherein the sequential and parallel steps and the transition conditions for the execution of the switching processes are determined using a Petri network.

5. A software tool for organizing execution of electronically controlled switching procedures, said software tool activating steps that are at least one of sequential or parallel through preset transition conditions, and deactivating the steps upon advancing the execution; said software tool deactivating inadmissible parallel steps during the activation of the activated steps; and said software tool placing the inadmissible parallel steps in a stored matrix.

6. The software tool according to claim 5, wherein said software tool compares just activated steps and already active steps to marked steps in the stored matrix upon the activation of the activated step.

7. The software tool according to claim 5, wherein said software tool performs the activation of the activated steps through an external prompt or through step activity.

8. The software tool according to claim 5, wherein said software tool determines the sequential or parallel steps and the transition conditions for the execution of the switching procedures using a Petri network.

9. A programming device having a software tool organizing execution of electronically controlled switching procedures, comprising:

a component that activates a step that is at least one of sequential or parallel via a preset transition condition;

a component that deactivates the activated step when the execution advances beyond the activated step;

a component that records parallel steps that are inadmissible during execution of the activated step in a stored matrix; and a component that deactivates the inadmissible parallel steps during the activation of the activated step.

10. A method for organizing execution of electronically controlled switching processes, comprising:

producing a matrix correlating switching process steps with respective other process steps that are prohibited from being executed simultaneously with the switching process steps;

activating given ones of the switching process steps by preset transition conditions and deactivating the activated steps upon completion of the execution of the activated steps, and utilizing the matrix to deactivate the respective other process steps during the execution of the activated steps.

11. The method according to claim 10, wherein the activated steps comprise sequential and parallel steps.

* * * * *